US005625410A

United States Patent [19]

Washino et al.

[11] Patent Number: 5,625,410
[45] Date of Patent: Apr. 29, 1997

[54] VIDEO MONITORING AND CONFERENCING SYSTEM

[75] Inventors: Kinya Washino, Dumont, N.J.; Barry H. Schwab, West Bloomfield, Mich.

[73] Assignee: Kinywa Washino, Mahwah, N.J.

[21] Appl. No.: 418,823

[22] Filed: Apr. 7, 1995

Related U.S. Application Data

[63] Continuation-in-part of Ser. No. 50,861, Apr. 21, 1993, Pat. No. 5,450,140, and Ser. No. 298,104, Aug. 30, 1994, Pat. No. 5,537,157.

[51] Int. Cl.$^6$ .................................................. H04N 7/18
[52] U.S. Cl. ........................... 348/154; 348/398; 348/552; 386/112
[58] Field of Search ................................ 348/153, 154, 348/159, 398, 552; 358/342; 386/112; H04N 7/18

[56] References Cited

U.S. PATENT DOCUMENTS

| | | | |
|---|---|---|---|
| 5,027,222 | 6/1991 | Shinbo | 358/342 |
| 5,095,196 | 3/1992 | Miyata | 235/382 |
| 5,272,527 | 12/1993 | Watanabe | 348/154 |
| 5,481,297 | 1/1996 | Cash | 348/398 |
| 5,491,511 | 2/1996 | Odle | 348/153 |
| 5,521,634 | 5/1996 | McGary | 348/153 |
| 5,526,133 | 6/1996 | Paff | 348/153 |

OTHER PUBLICATIONS

Intellution's Plant TV Brochure Date unknown.

*Primary Examiner*—Howard W. Britton
*Attorney, Agent, or Firm*—Gifford, Krass, Groh, Sprinkle, Patmore, Anderson & Citkowski

[57] ABSTRACT

A PC-based system for monitoring and storing representative images from video cameras may be utilized for security or other monitoring applications. Camera inputs from digital or analog sources are individually and independently digitized and displayed at a first set of image sizes, sampling rates, and frame rates, and may be stored in digital form on various recording media at a second set of image sizes, sampling rates, and frame rates, and these two sets of sizes and rates may or may not be identical. Provisions are included for adding detection or alarm systems which will automatically alter image size, sampling rate and/or frame rate of an individual input source, or activate other physical responses. In addition to security system monitoring, further applications of the invention are disclosed for process monitoring in manufacturing environments and also for applications in videoconferencing.

15 Claims, 8 Drawing Sheets

10" TO 14" VGA MONITOR          OPTIONAL MONITOR

14" TO 17" SVGA MONITOR

15" TO 20" HIGH RESOLUTION

20" TO 21" SUPER HIGH RESOLUTION MONITOR

20" TO 21" SUPER HIGH RESOLUTION MONITOR

14" TO 17" SVGA MONITOR

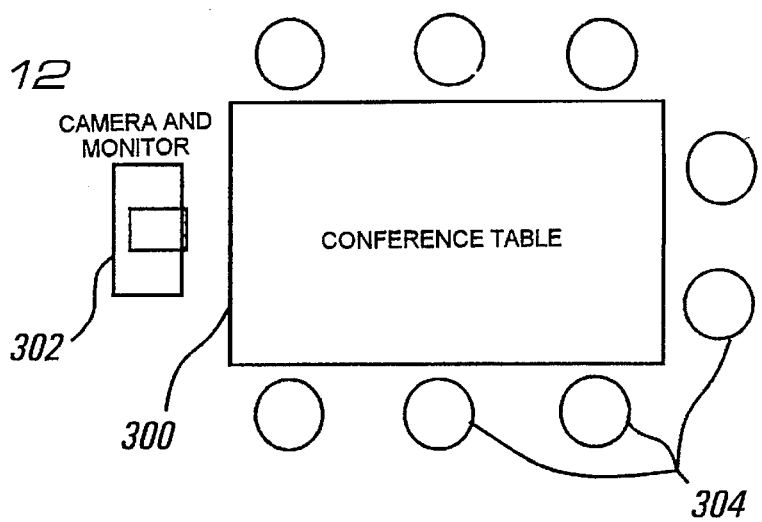
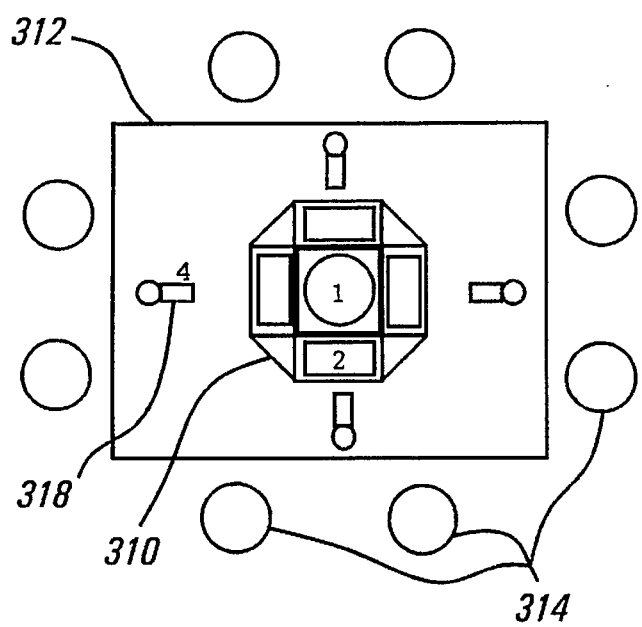
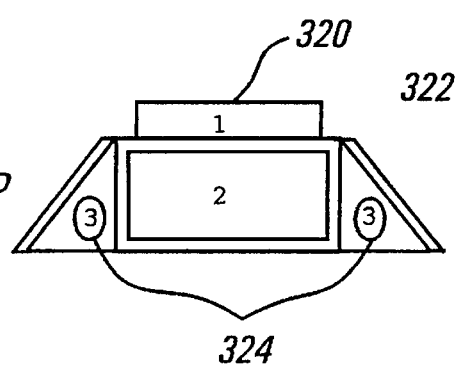
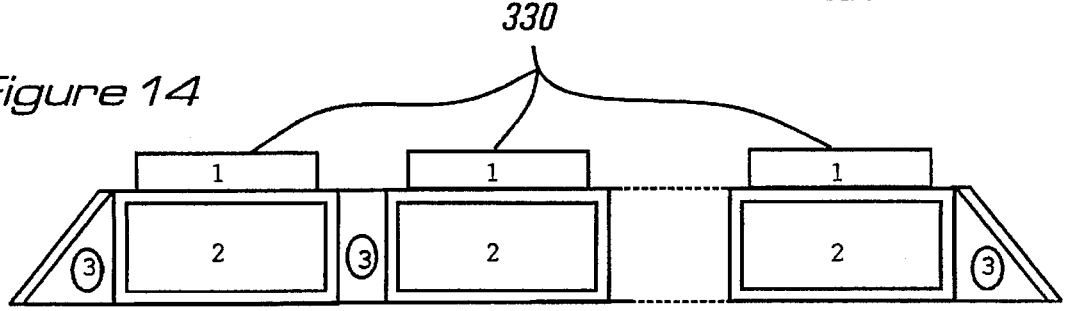

Figure 15

| Mode | Ref. Fig. | Monitor | | Number of Windows by Size | | | | | | | Recording Time (Hrs.) @ 1 fps @ 100:1 | |
| --- | --- | --- | --- | --- | --- | --- | --- | --- | --- | --- | --- | --- |
| | | Diag. Size | Pixel Dim. | 240 x 180 | 320 x 240 | 400 x 300 | 480 x 360 | 640 x 480 | 800 x 600 | | DAT: B&W/Color | 8-mm: B&W/Color |
| I | 1 | 10"-14" | 640 x 480 | | 4 | | | | | | 960 / 480 | 1920 / 960 |
| II | 2 | 14"-17" | 1024 x 768 | | 9 | | | | | | 480 / 240 | 960 / 480 |
| III | 3 | 15"-20" | 1280 x 1024 | | 8 | | | 2 | | | 360 / 180 | 720 / 360 |
| IV | 4 | 20"-21" | 1600 x 1200 | | 25 | | | | | | 180 / 90 | 360 / 180 |
| V | 5 | 20"-21" | 1600 x 1200 | | | 12 | | | 1 | | 180 / 90 | 360 / 180 |
| VI | 6 | 14"-17" | 1024 x 768 | 8 | | | 2 | | | | 240 / 120 | 480 / 240 |

VIDEO MONITORING AND CONFERENCING SYSTEM

REFERENCE TO RELATED APPLICATIONS

This application is a continuation-in-part of U.S. Ser. No. 08/050,861, filed Apr. 21, 1993 now U.S. Pat. No. 5,450,140 and Ser. No. 08/298,104, filed Aug. 30, 1994 now U.S. Pat. No. 5,537,157.

FIELD OF THE INVENTION

This invention relates generally to video monitoring, and, more particularly, to such systems employing means for digitizing camera images for display at a first image size, sampling rate, and frame rate, and for digital storage at a second image size, sampling rate, and frame rate.

BACKGROUND OF THE INVENTION

Existing systems for monitoring video signals from multiple sources either have relied upon switching means to sequence through each of the sources in a predetermined pattern, or else implement some form of "split screen" display, in which a conventional video monitor displays, for example, the output of four cameras, each occupying a portion of the display screen. Often, the video output is also supplied to signal storage means such as a VCR which is operated in a single-frame recording mode, providing a time-lapse record of the camera outputs. These types of systems are in common usage, and are well known in the art.

More recently, the availability of digital techniques for video signal processing and data compression has opened new video monitoring alternatives. Mathisen, for example, U.S. Pat. No. 4,198,656, describes a system employing a signal selector which is controlled by signal storage means, including a VCR functioning as a time-lapse frame recorder, and disc storage means functioning as a frame-store type device which provides continuity in the display while the selector is advancing through its sequence to the next signal source, or to the next recorded signal from one particular source. Each image is further provided with a digital code, which enables the image source to be identified upon playback.

Katz (U.S. Pat. No. 5,216,502) discloses a system for monitoring and recording transactions at multiple cashier lanes. According to the preferred embodiment, output signals from four cameras are fed to a four-quadrant multiplexer, which contains a frame store having provisions for reducing each camera image to one-quarter size and then displaying it in one of the four quadrants of the video monitor. The combined output signal is then recorded on a Video Cassette Recorder (VCR) to provide a more permanent record of the transaction. No description is given of the size-reduction method, but this kind of display may be implemented by employing a time-compression scheme for the horizontal lines, and eliminating alternate scan lines from the vertical dimension of the video frame. Data from the individual cash registers is encoded digitally, and then either recorded on lines of video in the vertical-interval or else recorded on the audio tracks of the VCR. The monitoring provisions include a video overlay generator, so that transaction information may be displayed concurrently with images of the event. Provisions are also included for selective recording of representative frames of video, as triggered by transaction events at individual cashier lanes. This further reduces the number of frames recorded, and extends the recording duration of the video cassette.

Neither of these two inventions disclose the use of image data compression schemes, nor of image resizing by digital means. Katz does disclose selective recording of frames of video, but only in analog form, and using conventional video recording means, such as a VCR.

Blum et al. (U.S. Pat. No. 5,237,408) disclose a system employing multiple interface circuit boards containing provisions for capturing and digitizing images from a plurality of cameras, further storing a slow-scan sequence of images for each camera in active buffer memory means as RAM on each of the interface boards. The display of these image sequences is preferably controlled by a PC with disk storage capabilities, and individual images selectively may be recorded on the hard disk, under operator control. Storage capacity is limited, however, because no image data compression is provided, and it is not practical to store large quantities or sequences of images. There are no provisions for automatic recording of images, nor any provision for storing these images in a data form differing from the display format image size.

Gormley (U.S. Pat. No. 5,258,837) discloses video compression means as a method for fitting multiple camera images within a single video display screen. However, Gormley clearly indicates that the system relies on fixed image-size compression of the digitized incoming video signal, and does not perform any kind of bandwidth compression. Provisions are included for storing images on a video recorder, but, as in other systems, these images are stored by taking the screen display as a whole, rather than storing independently constituted representations of the individual camera outputs.

In general, these conventional systems, regardless of the subsequent signal processing employed, accept analog video signals from the camera sources for input to the monitoring system. As such, these signals are susceptible to disturbances such as RF interference, ground-loop noise, and high-frequency signal loss due to long runs of coaxial cables. Automatic video switcher units sequence the source signals at a relatively slow rate, requiring as much as 16 seconds delay between successive viewings of a particular source when using a one source-per-second rate to sequence through 16 sources. When such a system is equipped with a time-lapse video recorder, the recording medium is expensive, has low resolution, and is limited in recording capacity.

Other systems, such as video conferencing arrangements, use multiple camera images and audio sources which are coordinated through electronic switching means and image display means, with interconnections between conferencing rooms locally or at remote sites via telephone lines or other communications links. Fabris et al. (U.S. Pat. No. 4,516,156) discloses a sophisticated implementation of such a system, employing satellite links for long-distance communications, a full range of camera remote controls (including lens controls and pan-tilt-head controls), and touch-screen monitor facilities for system controls of cameras and signal switching. This system, however, has no provisions for image storage, or any application of image data compression means coupled with display means or image storage means.

SUMMARY OF THE INVENTION

The present invention implements an automated video monitoring system by way of a PC-based platform employing display windowing software, with camera sources being interfaced to an input circuit board which includes provisions for image data compression. Using a basic image size in pixels of 320×240, and optionally including color processing employing a Y-U-V 4:1:1 or 4:2:2 sampling technique, a range of performance standards are established. An economical simultaneous display of 4 sources in a 2×2 configuration on a conventional 10" VGA-format (640×480 pixels) monitor may be upgraded to a more elaborate 24-source (plus one utility window, which also may be used as a graphical-based input source device for transmitting control commands to the individual cameras) display in a 5×5 configuration on a high-resolution 20" (1600×1200 pixels) monitor. Other combinations are possible, including arrays of images of size 640×480 pixels or even 800×600 pixels, depending on the screen size of the display monitor and the capabilities of the video display adapter circuit card. In addition, not all image windows need to be of the same size, nor updated at the same rate, but rather they may be mixed and combined based on particular applications. Remote controls for the individual cameras may be implemented by way of windowing software and/or monitor touch-screen devices. Automatic sensing of particular events (representing security alarms, equipment or process disturbances, or a change in the person speaking in a videoconferencing environment) may be employed to cause reconfiguration by way of resizing the image or modifying the update rate of individual windows on the display screen, or by modifying the data format of recording images on a storage device.

Storage of images may be implemented by way of a tape back-up device, such as a DAT or 8-mm tape recorder, which are capable of storing as much as 960 hours of monitoring images, or by way of disk storage devices, preferably including removable disk drives such as magneto-optical disks or PCMCIA-compatible disk-drive modules. Images are preferably stored as a succession of data-compressed representations, corresponding to various window sizes sampled at diverse update rates; however, though the image representations need not be identical to the sizes and rates used for video monitors displaying the various images. In an alternative embodiment, cameras are provided with data compression means at the camera location, with a bi-directional data link providing control signals from the PC, and accepting data-compressed images from the cameras. Depending on the data rates selected, the transmission of these signals may be by means of coaxial cables, twisted-pair lines, or fiber-optic cables. These signals may alternatively be transmitted over internal PBX telephone lines, or over greater distances, including satellite links, as would be the case for remote monitoring of facilities or videoconferencing. The use of digital images allows the application of various useful techniques, such as digital noise reduction and motion-sensing, to trigger security alarms, for example.

It is an object of the invention to provide a more efficient method for monitoring camera outputs by means of a multiple-window display system implemented on a computer platform.

It is another object of the invention to provide an improved recording system for event-logging or security applications, by means of storing data-compressed digital images, including identifying information, which are more representative of events than typical analog time-lapse recordings, and further to implement this system on a computer platform.

It is a further object of the invention to provide extended recording time for event-logging or security applications by means of either tape-based, or disk-based, or both tape-based and disk-based data recording means.

It is yet another object of the invention to provide a system for remote monitoring of cameras by means of transmission of data-compressed digital images over communication links.

It is yet a further object of the invention to provide a convenient method of implementing videoconferencing facilities by means of a PC-based platform.

BRIEF DESCRIPTION OF THE DRAWINGS

FIG. 12 is an overhead view of a physical layout of the system of FIG. 11;

FIGS. 13A and 13B are drawings of a multiple-camera monitoring unit for table-top use in videoconferencing;

FIG. 14 is a side-view of an expanded multiple-camera monitoring unit implemented for videoconferencing;

FIG. 15 is a table listing a variety of possible operating modes, depending on computer monitor display facilities, in either a monitoring or a videoconferencing version of the invention.

DETAILED DESCRIPTION OF THE PREFERRED EMBODIMENT

The present invention implements an automated video monitoring system by way of a PC-based platform employing display windowing software, with camera sources being interfaced to an input circuit board which includes provisions for image data compression. The basic video window size of 320×240 pixels from each camera source can be displayed on a variety of video monitors, in a number of formats, depending on system complexity. The preferred recording medium is a 4-mm helical-scan data cartridge, commonly referred to as a digital audio tape (DAT). Each tape cartridge is capable of storing 10 GB (gigabytes) of data. All recording times in the explanation below are based a data-compression ratio of 100:1, utilizing a 4:2:2 Y/U/V sampling method for color images. Other higher capacity media, such as 8-mm tapes capable of 20 GB of data storage, may be employed when longer times are desired.

FIG. 15 shows a variety of possible operating modes, depending on the particular implementation of the PC-based monitoring system. These six representative modes will be explained in detail with the understanding that the invention is by no means limited to the specific examples shown, and that many different alternatives are possible. It should be noted also that in certain of the implementations shown, the entire screen may not be occupied by the various windows, and any unused areas at the top, bottom, or sides may be utilized to display warning messages, control buttons, or other such facilities.

Figure 1:
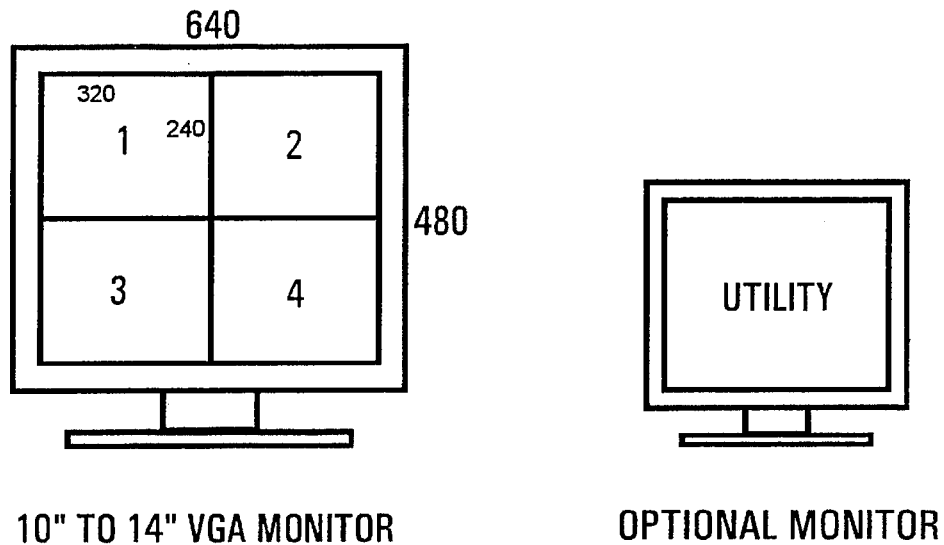
FIGS. 1–6 show various possible screen display configurations according to the invention.

FIG. 1 shows a computer monitor display for a system configured in accordance with Mode I as listed in FIG. 15.

Using a commonly available 14" VGA-format computer monitor with a dimension in pixels of 640×480, four windows having a dimension in pixels of 320×240 may be displayed simultaneously. Recording this data at the rate of one frame per second (1 fps) in black and white (B/W) and with 100:1 data-compression on a 10 GB DAT tape provides approximately 960 hours of images per tape, or alternatively more than 480 hours of color images. A second monitor optionally may be used to display utility windows including various system operating controls, as, for example, camera pan, tilt, zoom, focus, and so forth.

Figure 2:
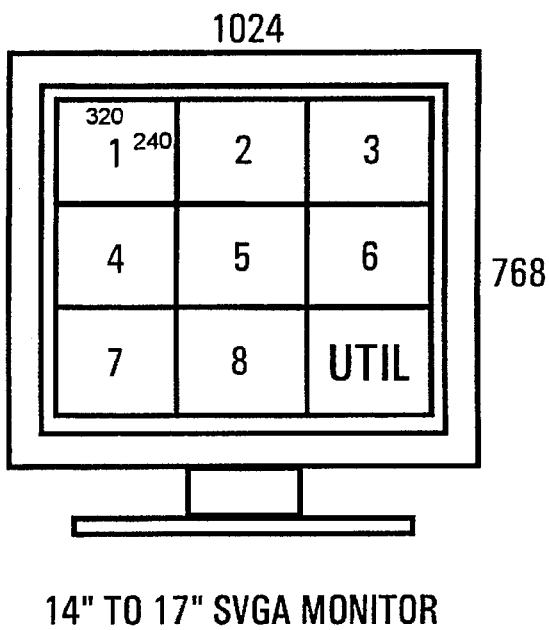

FIG. 2 shows a computer monitor display for a system configured in accordance with Mode II as listed in FIG. 15. Using a 15" to 17" SVGA-format computer monitor with a dimension in pixels of 1024×768, nine windows, each having a dimension in pixels of 320×240, may be displayed simultaneously. Eight windows may be implemented as camera displays, and the ninth window may be used for the continuous display of the utility window, as described above. Recording of all eight windows at 1 fps will allow 480 hours of B/W images in this configuration per 10 GB DAT tape, or alternatively more than 240 hours of color images.

Figure 3:
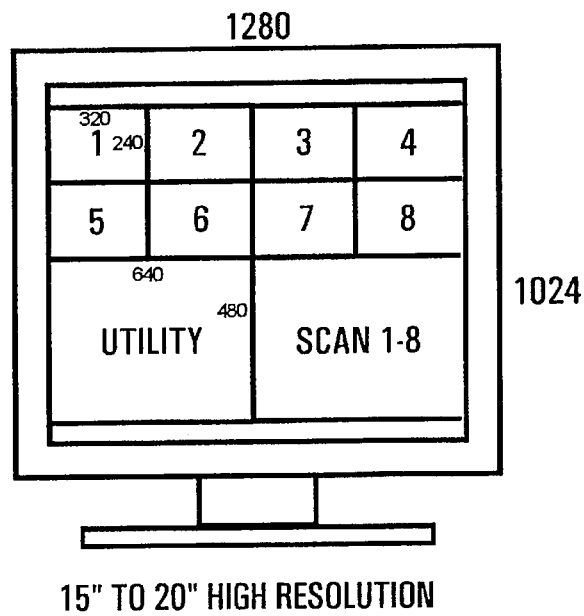

FIG. 3 shows a computer monitor display for a system configured in accordance with Mode III as listed in FIG. 15. Using a 17" to 20" high-resolution computer monitor with a dimension in pixels of 1240×1024, eight windows having a dimension in pixels of 320×240 may be displayed, in addition to two windows having a dimension in pixels of 640×480. One of these larger windows may be implemented as a utility window, and the other larger window may be implemented for sequential display of the eight camera inputs at full camera resolution having a dimension in pixels of 640×480. Recording all eight camera image windows, and also the input-scan window, at 1 fps will allow 360 hours of B/W images in this configuration per 10 GB DAT tape, or alternatively more than 180 hours of images in color.

Figure 4:
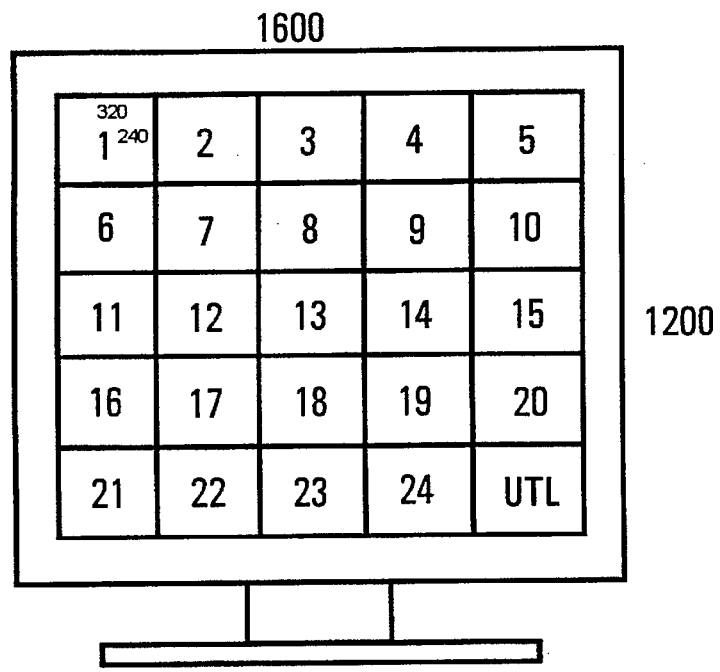

FIG. 4 shows a computer monitor display for a system configured in accordance with Mode IV as listed in FIG. 15. Using a 20" high-resolution computer monitor with a dimension in pixels of 1600×1200, 25 windows with a dimension in pixels of 320×240 may be displayed simultaneously. Twenty-four windows may be implemented as camera displays, and one is implemented as a the utility window. Recording all twenty-four windows, and also the utility window, at 1 fps will allow 180 hours of B/W images in this configuration per 10 GB DAT tape. If color recording is desired, a 20 GB 8-mm data cartridge will allow 180 hours of color images.

Figure 5:
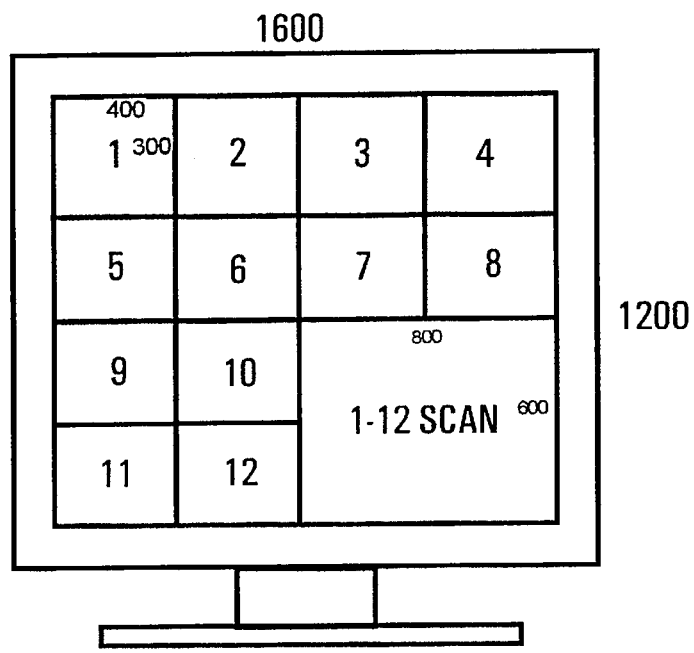

FIG. 5 shows a computer monitor display for a system configured in accordance with Mode V as listed in FIG. 15. Using a 20" high-resolution computer monitor with a dimension in pixels of 1600×1200, twelve larger windows having a dimension in pixels of 400×300 may be displayed, as well as one large high-resolution window, with a dimension in pixels of 800×600, to display the sequentially scanned output of the camera images. Recording in this format at 1 fps will provide 180 hours of B/W images in this configuration per 10 GB DAT tape. If color recording is desired, a 20 GB 8-mm data cartridge will allow 180 hours of color images.

Figure 6:
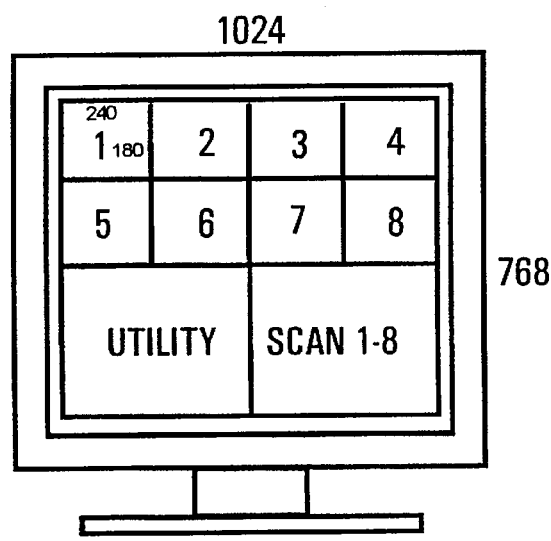

FIG. 6 shows a computer monitor display for a system configured in accordance with Mode VI as listed in FIG. 15. Using a 14" to 17" SVGA computer monitor with a dimension in pixels of 1240×1024, and implementing a smaller window size with a dimension in pixels of 240×180, eight windows are available for the camera image displays, and two large windows of 480×360 are available for sequentially-scanned camera images. Recording in this screen format at 1 fps allows 480 hours of B/W images in this configuration on a 20 GB 8-mm data cartridge, and allows 240 hours of images in color.

In any of the display configurations just described, it is also possible to use a video overlay technique to display the utility controls superimposed on the camera video. Regardless of which display or recording format is used, the PC based monitoring system includes various facilities and features, which will now be described in further detail.

In operation, the user need only observe the various display windows on the monitor screen, rather than concentrate on many monitors simultaneously, thereby reducing the risk of missing an important event. Since no video switcher is used in recording, and images from all sources are continuously recorded at the selected frame rate for each source, more information is recorded than in conventional analog systems, wherein events may be missed due to the sequential switching of input images. The digital format also improves the picture quality, as the signal-to-noise ratio will be higher than for analog systems. In addition, there is no loss of quality during recording or playback, and because the recording technique is digital, other types of information optionally may recorded along with the camera data, such as audio, time, date, location, etc.

An additional feature is the capability to implement a dual-recording-media option. This facility provides the ability to record simultaneously both on a tape (for high capacity, long term storage) and also on a removable media, such as a removable hard disk (i.e. PCMCIA) or magneto-optical disk (for short-term storage of up to 24 hours of images). These disks facilitate high-speed searching of recorded information without interrupting the tape, as well as providing a back up for the recording on the tape. In addition, the system is capable of simultaneously searching the recorded images on the disk storage unit while continuing to store images on the tape storage unit.

It should be noted that there is no requirement that the image sizes or frame rates utilized for the video display match those utilized for the storage media. In practice, these two specifications may not agree, and will be determined by other factors, such as operator manipulation of the displayed image sizes or changes resulting from the detection of alarm conditions.

Figure 7:
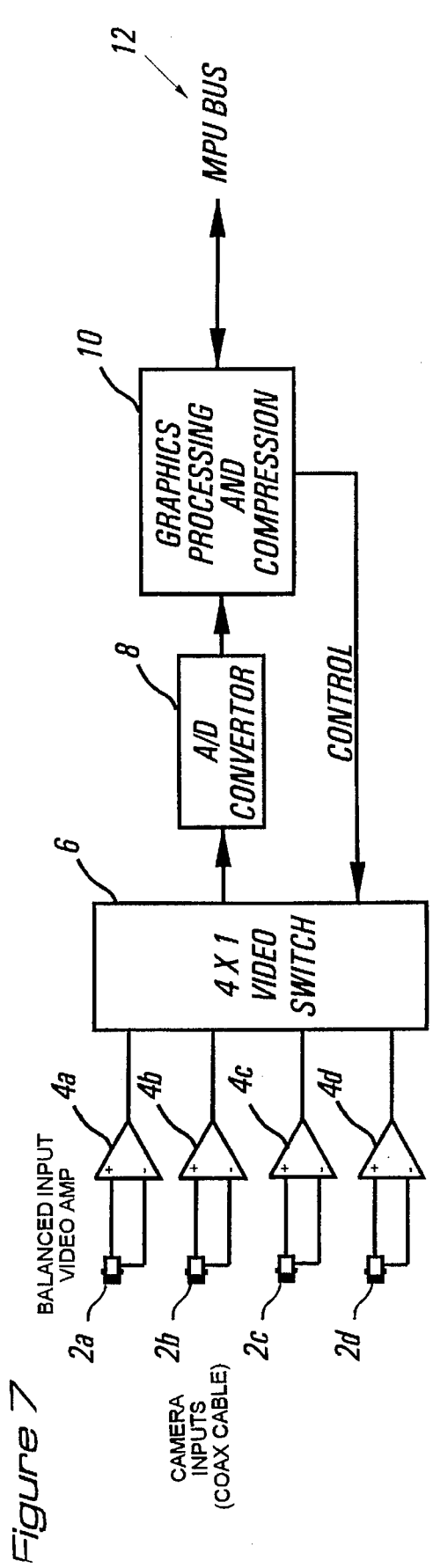
FIG. 7 is a functional diagram of a PC-based system wherein plug-in printed-circuit boards implement digital processing for analog input signals.

FIG. 7 shows a functional diagram of an analog input-digital processing card installed in the PC which allows the use of existing analog cameras and cables with the PC-based monitoring system. This card, which may be obtained from such manufacturers as Nova, Model No. V-SW, features four video inputs 2a–2d having balanced or differential input circuitry for good noise immunity (or optically-coupled inputs for fiber-optic cabling), four video amplifiers 4a–4d, a 4×1 video switcher 6 by which any one of the four video inputs may be selected as a signal source, and an analog-to-digital (A/D) converter 8. The recording of camera inputs is digital, however, there is no provision for remote control of camera functions such as pan, tilt, zoom, and so forth. If additional inputs are desired, multiple cards may be installed in the PC. The output of the A/D converter 8 is supplied to the graphics processor and image data-compression engine 10. This unit performs the various functions required to configure the image sizes and frame rates as specified by the equipment operator. Because the overall data recording bandwidth of the system is a factor in the selection of the individual picture data rates, computer software is provided to implement menu-driven management of the data bandwidth allocation to the various image sources. Based on this configuration, signals are provided to the video switcher 4 to facilitate the selection of the particular image sources as required. The data-compressed images are provided in digital form to the microprocessor data bus 12. The microprocessor unit (not shown) in turn provides control signals to the graphics processor 10 by way of this data bus, in accordance with the image data allocation configuration selected.

Figure 8:
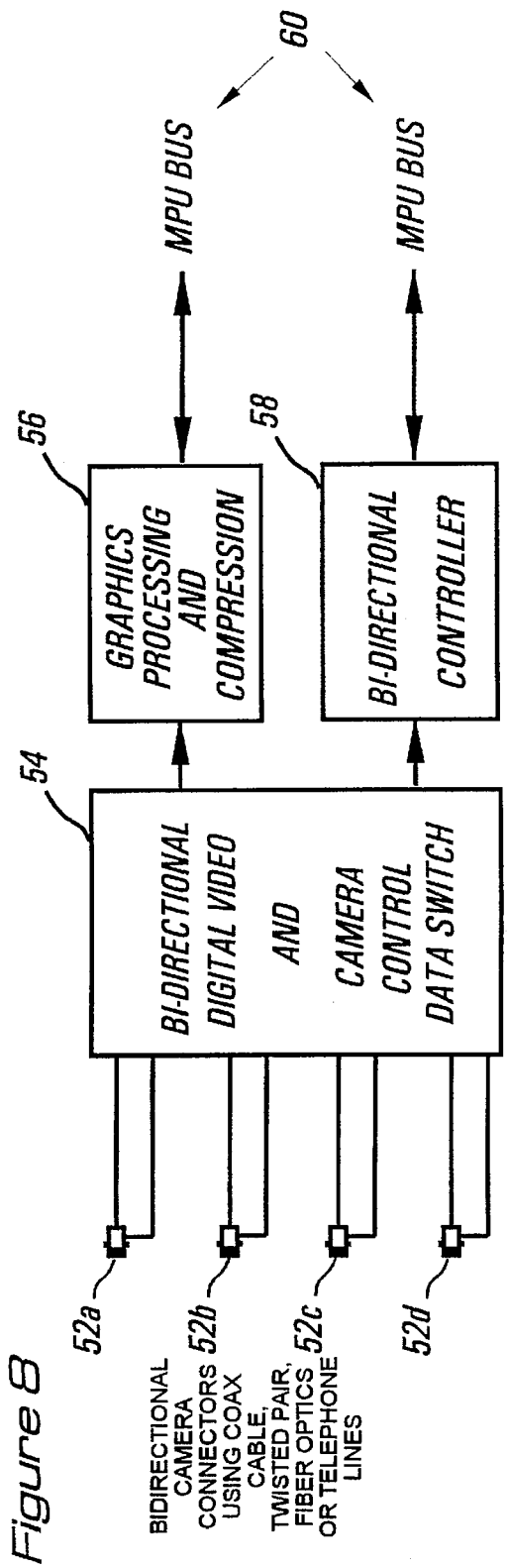
FIG. 8 is a functional diagram of a plug-in printed-circuit board introduced with reference to FIG. 7.

FIG. 8 is a functional diagram of a digital input/output-digital processing card which implements bi-directional digital communications to and from the camera/adapter unit over a single transmission line, thereby greatly reducing the cost of cable and installation, and allowing existing wiring to be used. Various implementations of this printed-circuit card are required, depending on the type of network interconnection media selected. In addition, system performance will depend on the type of network interconnection media. As an example, a fiber optic network will have a higher transmission rate and better signal quality than a telephone network. Interfacing technology for these communication methods are in common usage and well known in the art. This printed-circuit card also serves four cameras through inputs 52a–52d, and additional cards can be implemented if required. The bi-directional digital video and camera control data switcher 54 serves to select the individual image sources as explained in reference to FIG. 7. These source signals are then provided to the graphics processor and image data-compression engine 56, which provides similar functions to those provided by the graphics processor 10, discussed in reference to FIG. 7. The processed data-compressed images are then provided to the microprocessor data bus 60. However, in this implementation, the bi-directional nature of the data switcher 54 is exploited to provide full functional control of the camera facilities through the bi-directional controller 58. These functional controls include the cameras themselves (lens and exposure control) and the camera's physical mounting provisions (pan and tilt). The various control signals for these functions are those traditionally provided to these kinds of equipment, and these concepts are well known in the art. In an alternative embodiment, the individual cameras are each equipped with separate image data-compression facilities, utilizing such techniques as motion-JPEG or MPEG compression. In this case, control signals for these additional functions are provided from the microprocessor bus 60 through the bi-directional controller 58 and the data switcher 54.

Figure 9:
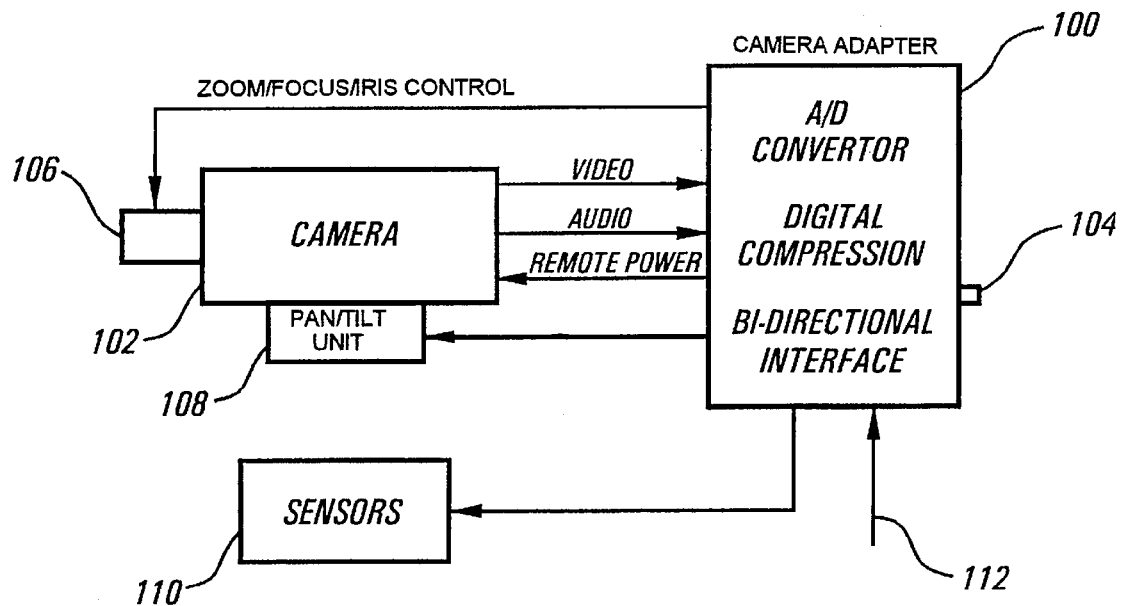
FIG. 9 is a functional diagram of a universal camera adapter having digital output signals.

FIG. 9 is a functional diagram of a digital output universal camera adapter. This is a fully digital version of the camera adapter as described in co-pending U.S. patent application Ser. No. 08/050,861, titled "PERSONAL-COMPUTER BASED VIDEO PRODUCTION SYSTEM" now U.S. Pat. No. 5,450,140. The A/D-converter, digital image data-compressor, and bi-directional interface camera adapter 100 accepts analog audio and video signals from the camera 102, and converts them to digital signals in anticipation of the transmission of these signals over the interconnection network 104. The camera adapter also receives camera control commands from the PC by means of the interconnection network, and translates them into the appropriate pan, tilt, zoom, focus and iris control signals for the particular camera equipment, including the camera lens 106 and the pan/tilt mounting facilities 108. In addition, the camera adapter also has inputs for several "alarm system" type sensors 110, as, for example, motion detectors, photocell detectors, or simple switches. These alarm signals are digitized, encoded, and then transmitted to the main PC by means of the interconnection network. Power is supplied for this equipment from a local source 112. This camera adapter is implemented to provide a full-function system, adaptable to all existing types of cameras and control equipment. However, because of the large number of interconnections involved in the adapter, camera, pan/tilt unit, and sensors, the installation process may be somewhat complicated.

By equipping an individual camera input with digital frame store capabilities, it is possible to detect an alarm condition based on deviations from the normal-state image scene. For example, if a camera is monitoring a door exit or an area of a warehouse aisle that is not utilized during evening hours, any change in the image would represent an alarm condition. To allow camera movement, this sensing process would be disabled during pan, scan, tilt, zoom, and other camera positioning controls, and the sensing would be re-enabled after camera positioning ceased, or by manual operator control.

Figure 10:
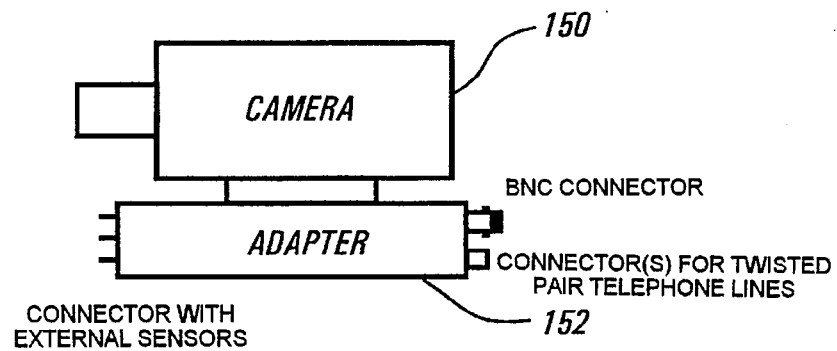
FIG. 10 is a diagram of an integrated camera system.

FIG. 10 is a functional diagram of an integrated camera system according to the invention including means to overcome problems associated with having a physically separate camera, pan/tilt unit, and adapter unit. The integrated system includes a camera 150 with pan/tilt control, A/D converter, digital data-compression circuitry, and requisite interfacing circuitry. Such provisions are preferably included in the camera base structure 152, which simplifies installation, as no separate interconnecting cables are required. The integrated camera system optionally may include provisions for supplying electrical operating power from a network coaxial cable, and thereby may be implemented with only a single interconnecting cable. An integrated camera system of this type may be implemented in a physical package which is as small as the camera itself, since most of the electronics may be highly miniaturized by developing custom integrated circuits, including LSI, ASIC, DSP, and mixed-signal processing.

It will be appreciated that in any of these implementations, alarm or sensor signals may be utilized to automatically re-configure the system operating mode, as, for example, increasing the frame rate or image size for an image source associated with the sensor which has initiated the alarm signal condition. As explained above, the displayed windows and image sizes may be reconfigured into an operating mode different from the reconfiguration of the digital storage mode. If desired, the operator may choose to allow the system to automatically adjust the compression ratio utilized for a particular window in response to alarm signal conditions. Alternatively, the compression ratio may be adjusted in response to the selection by the operator of a particular window for closer monitoring, by switching to an image window having larger dimensions in pixels. For some applications, the use of a resolution-independent data compression scheme, such as the "Fractal Compression" method of Iterated Systems, Inc., will be preferred, since images compressed by this method may be resized to fit larger or smaller windows as desired, without loss of apparent resolution. In addition, automatic switching of the audio signals associated with a particular window in response to alarm signal condition will enable the operator to fully investigate such events, and the audio signals may serve to attract the operator's attention to the event. Such switching optionally may be coupled with operator selections for monitoring purposes as well, and in both of these options may be integrated into the system previously described for recording the images, with or without any associated audio signals, onto the mass-storage media.

Figure 11:
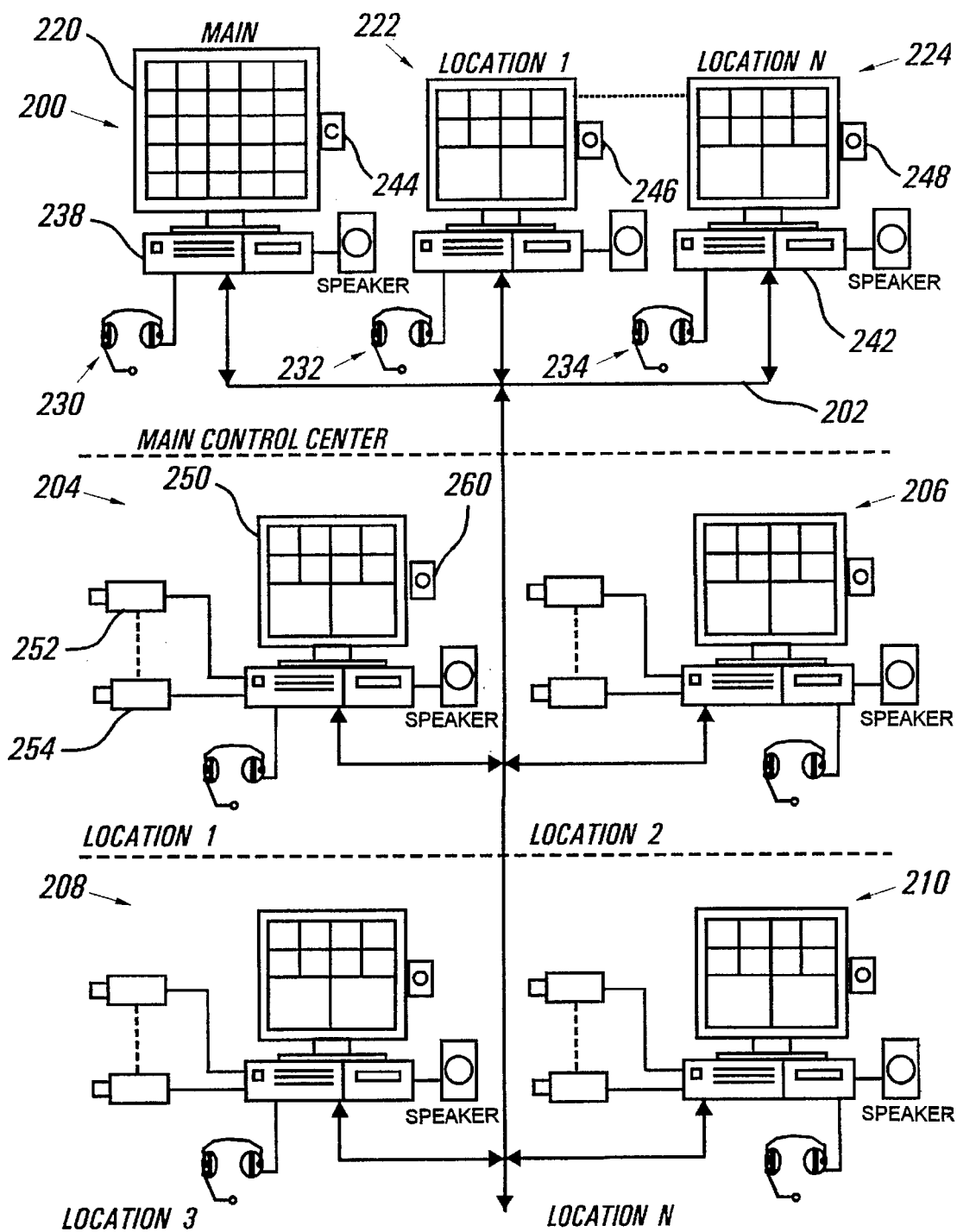
FIG. 11 is a functional diagram of a PC-based monitoring system adapted for videoconferencing at multiple remote locations.

FIG. 11 illustrates a PC-based monitoring system implemented for videoconferencing at multiple remote locations. In this application of the invention, a main control center, shown generally as 200, is interconnected, by way of a network, with remote locations, shown generally as 204 to 210, designated as "1" through "N". The network 202 may be implemented by way of telephone lines (slow speed), ISDN lines (medium speed), or alternatively coaxial cable or fiber optics cables (high speed). The higher speed implementations permit transmission at higher frame rates and higher image resolutions. As an alternative, wireless networks or microwave links optionally may be used. Network communication between the main and remote locations is bi-directional; the main computer receives audio, video, and sensor data from each of the remote locations, and transmits controls for camera pan, tilt, focus, zoom, and so forth. Audio and video communications for the system operators also is provided, by means of an additional camera and headset at each location.

The application of these PC-based monitoring techniques also may he implemented in cases in which the central monitoring area may be located at some distance from the remote site. In this case, the physical hardware and networking facilities will follow the example shown in FIG. 11, with the understanding that "Location 1" through "Location IN"' will now refer to separate monitoring for security applications or other monitoring purposes.

The purpose of the main control center is to manage multiple cameras at multiple locations. By monitoring and controlling the remote locations from a central location 220, the system may function without an operator at each location. Optionally, additional computers shown, by way of example, as 222 and 224 at the main location may be implemented to simplify the monitoring and control of the remote locations. The main control center stores the data from remote locations in the main control storage facilities, shown, by way of example, as 238, 240 and 242, using digital tape and removable media, including, by way of example, PCMCIA-based removable media or magneto-optical (MO) media. The images may be stored at various frame rates and resolutions, depending on the requirements for the intended use of the stored images. Intercom provisions as shown as 230, 232 and 234, facilitate the coordination of activities between the main control center and the various remote locations, and video camera units are provided at each of the computers, shown, by way of example, as 244, 246 and 248.

Each remote location includes a PC/monitor 250, with multiple video cameras, shown, by way of example, as 252 and 254, including provisions 256 for image and data storage utilizing digital tape and other removable media. This remote location may be operated under control from either the main location (as described above), or a local operator, or by specific software designed for automatic control. In the case of software-controlled operations, provisions are included for control to be assumed by the main control center, if necessary. As in the case of the main control computers, each of the remote computers is equipped with intercom facilities as 258 and video cameras as 260.

In the traditional videoconferencing situation, only one camera and monitor are used. Unfortunately, this results in an unnatural scene which provides the users with only a single viewing perspective. The use of a wide-angle camera lens which is needed to include many people seated around a table creates a distorted view, especially for those seated furthest from the camera. FIG. 12 shows an overhead view of the typical videoconferencing arrangement, including conference table 300, camera and monitor 302, and conference participants, shown as circles as 304.

Using the PC-based monitoring system, it is possible to create a video conference that presents a much more natural viewing appearance. As shown in FIG. 13A, a multiple-camera, multiple-display unit 310 preferably is preferably located directly on the conference table 312. This reduces the camera-perspective-distorting effects just described, because conference members 314 may be seated in a more comfortable and convenient position. The resulting video image is also much more natural. Each controller remote site computer-display section 322 (as described herein below) simultaneously shows all of the members participating in the remote conference, with an individual video window allocated for each participant, under control from the PC-based monitoring system operator. In practice, the remote site equipment operator will select one of the display operating modes as described in FIG. 15, depending on the number of subjects (camera views) and the capabilities of the remote site computer equipment. Optionally, an additional camera 316 fitted with a wide-angle lens will provide an overall view of the conference room, in accordance with more traditional systems.

To facilitate the aiming of the individual cameras for the participants, an arrangement such as that implemented at airport gates to assist the parking of airplanes (typically an "I" and an "O" formed of neon light tubes is utilized for airplane gate parking) optionally may be included. In this case, the two indicators are mounted so as to overlap only when viewed directly along the optical axis of the camera lens system. Thus, the camera position need only be adjusted so as to cause the indicators to overlap, thereby assuring that the camera correctly is aimed at the subject. A number of microphones 318 are situated around the conference table in locations suitable for proper audio coverage of the participants' speech.

FIG. 13B shows a side-view depicting the physical layout of each of the four sides of the multiple-camera, multiple-display unit 310. The top unit 320 houses the individual cameras (2 to 8 units) and associated electronics, optionally including aiming provisions as described herein above. An LCD display screen 322 shows the various camera images of the conference participants. Speakers located at positions 324 provide audio from the remote sites.

As shown in FIG. 14, the multiple-camera/display unit shown in FIG. 13B preferably is modular in construction including removable side panels, in order to facilitate expansion along either horizontal axis so as to accommodate any size or shape conference table, with each section of the unit serving up to four conference participants. In the preferred embodiment, the entire unit preferably is constructed so as to provide a low profile, by utilizing slanted LCD display panels 330 to create a minimum obstruction for the local conference participants. If a low profile design is not required, the display panels optionally could be larger, and mounted vertically. Until color LCD panels become more cost-effective, the display unit would be constructed with any of the currently available small LCD projector systems. Each conference location may include a designated PC operator, however, the implementation of the network connection facilitates control of the system from a remote location.

It should be noted that the implementation of the PC-based monitoring system is not limited to these examples of security systems or videoconferencing. Many alternative implementations, such as workplace, factory, production line, and process monitoring, would benefit from this system, and these alternative implementations should be considered to be within the scope of the invention.

We claim:

1. A video storage and display system, comprising:

a plurality of video cameras, each outputting a signal representative of a video image;

means to receive the signals from each camera and digitally compress the images;

two forms of high-capacity storage media, one being randomly searchable while the other continues to store the digitally compressed image; and a computer configured to receive the digitally compressed images, the computer being interfaced to the following devices:

a display screen, means to receive externally derived operator commands, and the high-capacity storage media, and wherein the computer is programmed to perform the following functions:

display the digitally compressed images from the cameras in different windows on the display screen, each window being associated with an update rate and dimensions in pixels, vary the dimensions and the rate at which a particular image is updated in its window in accordance with one of the externally derived commands, store the digitally compressed images in the high-capacity storage medium, and vary the dimensions and the rate at which a particular image is stored in accordance with one of the externally derived commands.

2. The video storage and display system of claim 1, further including means associated with the computer for controlling the operation of one or more of the video cameras.

3. The video storage and display system of claim 1, wherein the means to digitally compress the image from a particular camera is disposed at the location of the camera.

4. The video storage and display system of claim 1, wherein the means to digitally compress the image from a particular camera is disposed at the location of the computer.

5. The video storage and display system of claim 1, further including a separate computer associated with each camera, the computers being networked together over a common communication bus, enabling an operator situated at a particular computer to display the images gathered by other cameras in separate windows on that operator's display screen.

6. The video storage and display system of claim 1, wherein the high-capacity storage medium comprises a magnetic tape.

7. The video storage and display system of claim 1, wherein the high-capacity storage medium comprises a magnetic disk.

8. The method of simultaneously displaying and storing multiple video images, comprising the steps of:

receiving video images from a plurality of sources;

digitizing one or more of the images if not already in digital form;

displaying at least certain of the digitized images in separate windows on a display device, using a first, predetermined frame rate and resolution associated with each window; and simultaneously storing the displayed images using a second, predetermined frame rate and resolution associated with each image.

9. The method of claim 8, further including the step of receiving a command to set the frame rate and resolution associated with the display and storage of a particular image.

10. The method of claim 9, wherein the command is based upon an operator input.

11. The method of claim 9, wherein the command is based upon an external stimulus.

12. The method of simultaneously displaying and storing multiple video images, comprising the steps of:

receiving video images from a plurality of sources;

digitizing one or more of the images if not already in digital form;

displaying at least certain of the digitized images in separate windows on a display device, using a first set of temporal and spatial parameters associated with each image in each window;

simultaneously storing the displayed images using a second set of temporal and spatial parameters associated with each image.

13. The method of claim 12, the temporal parameters including frame rate.

14. The method of claim 12, the spatial parameters including image dimension in pixels.

15. A video storage and display system, comprising:

a plurality of video cameras, each outputting a signal representative of a video image;

means to receive the signals from each camera and digitally compress the images; and a computer configured to receive the digitally compressed images, the computer being interfaced to the following devices:

a display screen, means to receive externally derived operator commands including means for sensing a deviation from the normal-state image scene associated with at least one of the video cameras, the existence of the deviation being used as the basis for generating an externally derived command, and a high-capacity storage medium, and programmed to perform the following functions:

display the digitally compressed images from the cameras in different windows on the display screen, each window being associated with an update rate and dimensions in pixels, vary the dimensions and the rate at which a particular image is updated in its window in accordance with one of the externally derived commands, store the digitally compressed images in the high-capacity storage medium, and vary the dimensions and the rate at which a particular image is stored in accordance with one of the externally derived commands.

* * * * *